Patented Oct. 17, 1944

2,360,477

UNITED STATES PATENT OFFICE 2,360,477

POLYMERIC ACETALS AND PROCESS OF FORMING SAME

Joseph Dahle, West Newton, Mass., assignor to Gustavus J. Esselen, Inc., Boston, Mass., a corporation of Massachusetts No Drawing. Application April 11, 1941, Serial No. 388,143

7 Claims. (Cl. 260—231)

My present invention relates to a new method of producing substances of the acetal type many of which are resin-like. By my new process I can make water resistant resins from such base materials as polyvinyl alcohol, dextrin, starch and cellulose, etc. etc. I have also succeeded in making a water insoluble resin directly from polyvinyl alcohol without dissolving the polyvinyl alcohol or the insolubilized product. These results come from the discovery of a novel reaction and method of carrying out the reaction. The procedure is essentially topochemical, i. e. the base material does not go into solution during the reaction but remains substantially solid although more or less swelling may take place depending on the particular combination of reagents employed.

If under the conditions of the reaction the reaction product would ordinarily be soluble in the reaction mixture, a miscible non-solvent for the reaction product may be added in order to keep the reaction topochemical in character.

I believe that I am the first to discover how to render water and moisture resistant, articles made from polyvinyl alcohol.

I have discovered:

First, that solid substances containing hydroxyl groups may be reacted upon by an acetal, preferably in the presence of a catalyst, without converting them into a solution. However, this reaction ultimately reaches an equilibrium which is far short of reacting all of the hydroxyl groups and leaves a considerable proportion of unreacted hydroxyl groups.

Second, if it is desired to react a higher proportion of the hydroxyl groups, this can be accomplished by reacting with an acetal in the presence of an aldehyde, of a catalyst and, if desired, of a water absorbing substance. The effect of the aldehyde is to convert the by-product alcohol resulting from the first reaction into more of the original acetal thus removing the by-product alcohol from the zone of reaction and shifting the equilibrium in the desired direction. In this secondary reaction between the by-product alcohol and the aldehyde, water is produced and the water absorbing substance is introduced to remove the water from the zone of the reaction and allow the reaction to proceed further. In this way, the original reaction between the substance containing hydroxyl groups and the acetal can be made to proceed much more nearly to completion.

In the reaction, as I understand it, there are two steps or stages, although the second step proceeds simultaneously with the first.

1. An exchange reaction in which the aldehyde group of the reacting acetal reacts with hydroxyl groups of the base material to form a different or resultant acetal, and the remainder of the reacting acetal unites with the hydrogen of the hydroxyl groups of the base material to form by-product alcohol.

2. A reaction of the free aldehyde with the by-product alcohol formed in the first stage which would otherwise tend to block the reaction. This second reaction forms more of the original reacting acetal and water. Preferably this water is removed from the reaction zone by some water absorbent substance or by evaporation.

The following examples with polyvinyl alcohol as a base material serve to illustrate he two steps of the reaction.

*First step.*—44 grams polyvinyl alcohol (screened through 80 mesh and dried) were mixed with 380 grams methyl formal and 3.8 grams sulfuric acid as a catalyst. The mixture was refluxed for 2 hours at 44–46° C. The product, after washing and drying, was analyzed for hydroxyl content and found to have 34.5% expressed as vinyl acohol. Analysis of the powdered polyvinyl alcohol before the treatment showed it to have 98.5% hydroxyl groups calculated as vinyl alcohol.

The foregoing is given to show the effect of the treatment of polyvinyl alcohol with an acetal in comparison with the effect where an aldehyde is also used to prevent the reaction slowing down and eventually ceasing, as shown in the following example:

*First and second steps performed simultaneously.*—44 grams powdered polyvinyl alcohol (screened through 80 mesh and dried) were introduced into the following mixture:

| | |
|---|---|
| Methyl formal | gms 304 |
| Paraformaldehyde | gms 30 |
| Sulfuric acid | gms 3.5 |

The whole was refluxed for two hours, then washed, dried and analyzed. The product was found to have 7.0% hydroxyl groups calculated as vinyl alcohol.

Thus the hydroxyl content expressed as vinyl alcohol was reduced from 98.5% to 34.5% by the first step alone and from 98.5% to 7.0% by the first and second steps combined. Throughout the treatment the polyvinyl alcohol remained in the condition of separate particles although there was some swelling. In these two examples, the molecular ratio of polyvinyl alcohol to the total formaldehyde, i. e., that in the methyl formal and in the paraformaldehyde, is the same, and the catalyst in each case is approximately one percent of the weight of the formaldehyde containing materials.

The foregoing reactions may be represented by the following equations:

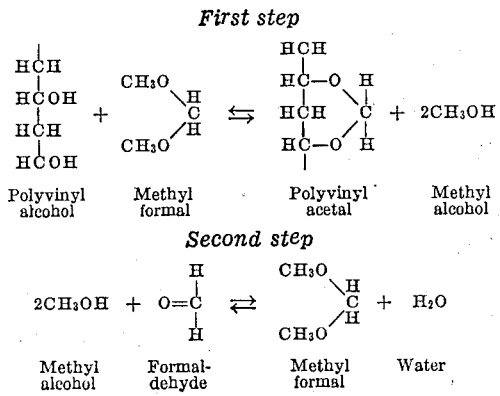

Of course, it will be understood that the first equation above indicates the reaction of only a single molecule of methyl formal with two hydroxyl groups on the same molecular chain of polyvinyl alcohol. In producing polyvinyl acetals hitherto it has been customary to use either polyvinyl alcohol dissolved in water or suspended in a liquid which is a solvent for the resulting polyvinyl acetal; or polyvinyl esters dissolved in a liquid which is a solvent for the polyvinyl acetal. When polyvinyl alcohol dissolved in water is reacted with aldehydes in the presence of a catalyst, polyvinyl acetals containing a large amount of unreacted hydroxyl groups are produced. When the polyvinyl alcohol is suspended in a solvent for the resulting polyvinyl acetal somewhat higher degrees of reaction are possible by using large excesses of aldehyde. When polyvinyl esters are used the final reaction product contains substantial quantities of unreacted hydroxyl groups as well as unhydrolyzed and unreacted ester. By my novel process higher degrees of reaction are possible. In addition, products having different physical properties are produced although the percentages of unreacted hydroxyl groups may be the same.

Such a product would be indicated by the following formula:

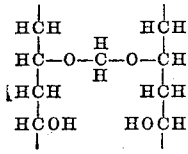

The above formula is given to indicate cross-linkage, but it will be understood that the extent of cross-linkage may vary and that it is not intended to imply that the cross-linkage is complete.

It will be understood that the other reactions will be the same as in the first instance cited above.

The reasons for believing that such cross-linkage between molecules do occur when the reaction is carried out under topochemical conditions are that the acetals thus formed are less soluble in solvents than are acetals of corresponding composition formed in solution; and furthermore, the acetals formed under topochemical conditions have higher softening points than acetals of corresponding composition formed in solution, indicating an increase in molecular weight.

For base substances, I have found it possible to employ materials containing hydroxyl groups, such for instance as polyvinyl alcohol, cellulose, starch, and dextrin. These materials are given merely by way of example. I believe that my novel topochemical reaction may be performed upon other base materials, the essential being that they contain hydroxyl groups which can react with an acetal to form as a by-product a substance which in its turn may be converted into more of the reacting acetal by reaction with an aldehyde.

The aldehyde which is present in the reaction medium is preferably but not necessarily the aldehyde of the reacting acetal employed. For instance, in the manufacture of an acetal of acetaldehyde, it is possible to employ formaldehyde or paraformaldehyde in the reacting medium. This leads to acetals of mixed type.

With many substances it is desirable to carry out the reaction in the presence of a dehydrating agent such as anhydrous sodium sulfate which will remove water from the zone of the reaction.

While it is usually more convenient to include the aldehyde, wholly or partly, in the treating bath, I have found that it also is possible to mix it to a certain extent at least with the base material before treatment, and, if desired, to include additional aldehyde in the treating bath.

The following are examples of typical reactions:

Example No. 1.—Fifty grams of powdered, dried polyvinyl alcohol was refluxed while stirring in a bath consisting of:

| | |
|---|---|
| Methyl formal _____gms__ | 360 |
| Paraformaldehyde _____gms__ | 40 |
| Ethyl sulfuric acid_____gms__ | 4 |
| Sodium sulfate anhydrous_____gms__ | 50 |

After approximately sixteen hours of refluxing, during which time the polyvinyl alcohol grains seemed to swell but always remained as individual particles, the reaction was discontinued and the reaction product washed with dilute ammonia in water-methanol, followed by several alkaline water washes to remove traces of the catalyst; after several further water washes the sample was dried. A white powder very much like the original polyvinyl alcohol was obtained. However, it was not soluble in water any more, not even after boiling for several hours. The powder was also insoluble in the common solvents for polyvinyl acetals such as 60% aqueous acetic acid, ethylene dichloride-methanol (80–20 by volume) and 1.4-dioxan. Its hydroxyl content was found to be 14.0% calculated as vinyl alcohol. The original polyvinyl alcohol analyzed by the same method showed 98.5% hydroxyl groups, calculated as vinyl alcohol. The resin without plasticizer could be molded at high temperatures, approximately 180° C. under pressure of 500–1000 lbs. per square inch.

Example No. 2.—About twenty grams of the product from Example No. 1 was placed in a bath consisting of:

| | |
|---|---|
| Methyl formal _____gms__ | 180 |
| Paraformaldehyde _____gms__ | 20 |
| Ethyl sulfuric acid_____gms__ | 2 |
| Sodium sulfate, anhydrous_____gms__ | 20 |

It was refluxed for twelve hours. Some of the methyl formal was lost during this period so that an almost dry mixture remained. This was removed from the flask and dried in air for four hours, followed by oven drying at 70° C. overnight. Some discoloration occurred during this time.

The product was washed once in faintly alkaline water, followed by six washes with distilled water containing up to 10% methanol. Drying at 75° C. in an oven overnight followed. This material analyzed only 2.5% hydroxyl groups calculated as vinyl alcohol. Thus, the reaction was practically 98% complete. The product was a very tough resin which did not soften below 190° C.

*Example No. 3.*—Thin sheets of water-soluble polyvinyl alcohol wrapped on glass cylinders were treated in a bath containing methyl formal 180 parts; paraformaldehyde 20 parts; ethyl sulfuric acids 2 parts. In some cases, twenty parts of a dehydrating agent (anhydrous sodium sulfate) was used; in others it was omitted. The sheets swelled but retained their shape. The reaction was carried out at room temperature for eighteen hours without stirring. The sheets were then removed from the cylinders and air-dried for a short time, then tested for insolubility in boiling water which had been made faintly alkaline to neutralize the acid catalyst. After seven hours of continuous boiling none of the samples showed signs of dissolving.

Where no dehydrating agent had been used the sheet was fairly soft; where dehydrating agents had been used the sheets were harder. Where the sheet had been in direct contact with the dehydrating agent it was distinctly harder than where it had not.

*Example No. 4.*—Yarn, made by extrusion from polyvinyl alcohol 100 parts, and paraldehyde 25 parts, and subsequently stretched on drying, was refluxed for 3 hours on a reel in a bath composed of:

| | |
|---|---|
| Methyl formal | gms.. 90 |
| Paraformaldehyde | gms.. 7 |
| Methanol | gms.. 2 |
| Ethyl sulfuric acid | gms.. 1 |

After removal from the bath, the yarn was heated at 60° C., in an atmosphere of an inert gas (carbon dioxide) for 4 hours. To remove excess acid it was then refluxed in methyl formal vapor for 3 hours, followed by drying at 100° C. for 2 hours.

This yarn was insoluble in water even after 1 hour's boiling. It had a fair tensile strength. After 5 minutes' boiling it showed 15% shrinkage. No further shrinkage was found after one hour's boiling.

It will be observed that some aldehyde was incorporated with the polyvinyl alcohol before the yarn was formed, and that additional aldehyde was included in the bath, a procedure which I have found advantageous in the manufacture of yarn.

*Example No. 5.*—A piece of purified cellulose in the form of filter paper was refluxed for three minutes in a reaction mixture of:

| | |
|---|---|
| Ethylene glycol formal | gms.. 100 |
| Paraformaldehyde | gms.. 30 |
| Ethyl sulfuric acid | gms.. 1.2 |
| Sodium sulfate—anhydrous | gms.. 15 |

It was removed from the bath and dried at 75° C. after which it was washed with water and neutralized with 0.1% solution of triethanolamine in water. It was then dried. After this treatment is was found that the wet strength of the paper had increased and that the paper could be boiled in water without disintegration. It was also noticeably stiffer.

*Example No. 6.*—A sheet of regenerated cellulose (Cellophane), not moisture proof, was treated at room temperatures for ten minutes in the following mixture:

| | |
|---|---|
| Methyl formal | gms.. 89 |
| Paraformaldehyde | gms.. 10 |
| Ethyl sulfuric acid | gms.. 1 |

On removal it was dried and washed and dried again and then showed an improved resistance to boiling water and increased stiffness, and was somewhat brittle.

*Example No. 7.*—Glycerol formal 114 grams, paraformaldehyde 30 grams, dibutyl phthalate 10 grams, phthalic anhydride 1.0 gram and ammonium chloride 0.3 gram were heated together to dissolve the paraformaldehyde, and then allowed to cool to room temperature.

Strips of non-moisture proof Cellophane were treated in the above mixture for 5, 60 and 180 minutes, removed and heated for 15 minutes at 78° C., then washed in water containing 0.1% sodium bicarbonate and dried at 50° C. for 2 hours. The water-resistance, as shown after one minute in boiling water, was fair for the Cellophane which had been treated for five minutes and good for the samples treated for the longer times. An untreated sample of the same type of Cellophane was poor under the same testing conditions. As the reaction time was increased an increase in brittleness was noted.

*Example No. 8.*—Spun rayon fabric, made from viscose rayon and freed from sizing, was refluxed for 10 minutes in a bath consisting of methyl formal 100 parts, paraformaldehyde 10 parts, ethyl sulfuric acid 1 part and anhydrous sodium sulfate 10 parts. It was then washed with dilute aqueous ammonia followed by several water washes, dried and ironed. It was conditioned at 70° F. and 65% relative humidity for more than 12 hours.

When tested for stiffness it was found that the treated samples were definitely stiffer than those which were not treated.

*Example No. 9.*—Spun rayon fabric made from viscose rayon and freed from sizing was resized by treating the fabric with a 2.5% solution of cornstarch in water at 90° C., followed by ironing until dry. The fabric was then treated exactly as the rayon fabric in Example No. 8. There was a slight loss in stiffness during the formal treatment.

Samples of untreated and treated fabric were then boiled for 30 minutes in water containing soap 0.5% and soda ash 0.1%, rinsed twice and ironed dry. After conditioning at 70° F. in air of 65% relative humidity for at least 12 hours, it was found by test that the untreated sample had lost most of its stiffness whereas the treated sample had lost but little stiffness.

*Example No. 10.*—Fifty grams of water-soluble powdered dextrin was suspended in the following mixture:

| | |
|---|---|
| Methyl formal | gms.. 100 |
| Paraformaldehyde | gms.. 20 |
| Ethyl sulfuric acid | gms.. 8 |
| Sodium sulfate, anhydrous | gms.. 30 |

The mixture was allowed to stand at room temperature for several days with frequent shaking, during which the dextrin did not go into solution.

The solid reaction product was then separated and washed with dilute ammonia to remove excess paraformaldehyde, and this was followed by several water washes and drying.

The dried product was boiled in water for one-half hour without dissolving, while ordinary dextrin went into solution immediately. Dextrin treated in aqueous formaldehyde in the presence of an acid catalyst dissolved in the reaction mixture and remained soluble in water.

*Example No. 11.*—Dextrin, 80 grams, was suspended in diethyl acetal 295 grams, paraldehyde 22 grams, and ethyl sulfuric acid 3.2 grams. Under continuous stirring it was refluxed for four hours. The reaction product was washed first in aqueous methanol, 60%, then with several water washes. The resulting product was a yellow powder which was insoluble in water at room temperature although it swelled considerably and gradually went into solution as the temperature of the water was raised. However, it was not as readily soluble as untreated dextrin, which went into solution rapidly even at room temperature.

*Example No. 12.*—Twenty grams of powdered cornstarch was refluxed for ten minutes in a bath consisting of:

| | |
|---|---|
| Methyl formal | gms__ 100 |
| Paraformaldehyde | gms__ 10 |
| Ethyl sulfuric acid | gms__ 1 |
| Sodium sulfate-anhydrous | gms__ 10 |

Afterwards the product was washed with ammonia water and dilute alkali to remove excess paraformaldehyde and catalyst, followed by several water washes. The reaction product was boiled in water for several hours without dissolving although some swelling took place.

*Example No. 13.*—Cornstarch, 80 grams, was added to a mixture of ethylene glycol formal 185 grams, paraformaldehyde 15 grams, and ethyl sulfuric acid 2 grams. The mixture was refluxed for four hours and continuously stirred. After washing and drying, the reaction product was insoluble in boiling water.

*Example No. 14.*—Our hereindescribed process may also be employed to treat solid acetal resins and thereby produce certain new substances. For instance, the acetal of polyvinyl alcohol and formaldehyde, as ordinarily made and sold on the market, contains 5% to 20% of unreacted, free hydroxyl groups, i. e., which have not been combined with the aldehyde. By topochemical treatment of such polyvinyl acetals in accordance with the hereindescribed process, some of these free hydroxyl groups can be reacted with the result that a product having substantially different physical properties from the original acetal is produced. For example: One hundred grams of commercial polyvinyl formal in powder form was soaked for several days at room temperature in the following composition:

| | Grams |
|---|---|
| Methyl formal | 540 |
| Paraformaldehyde | 54 |
| Ethyl sulfuric acid | 6 |

The reaction product was washed four times with methyl formal. One part was then washed with water and alkali several times and then dried. The other part was heated at 50° C. for 72 hours, and then washed with alkali and water several times and dried.

The change in composition was determined by analysis with the following results:

| | Commercial polyvinyl formal | After the bath treatment | After the bath and the heating treatments |
|---|---|---|---|
| | Per cent | Per cent | Per cent |
| Ester groups (as vinyl acetate) | 12.2 | 1.8 | 1.7 |
| Alcohol groups (as vinyl alcohol) | 8.6 | 7.0 | 7.0 |
| Acetal groups (by difference) | 79.2 | 91.2 | 91.3 |

Thus the topochemical treatment in the formal bath has reduced the number of ester and alcohol groups and raised the percentage of acetal groups. The subsequent heat treatment did not affect the composition noticeably.

Solubilities of the three materials compared as follows:

| | Commercial polyvinyl formal | After the bath treatment | After the bath and the heating treatments |
|---|---|---|---|
| Ethylene dichloride-methanol, 80-20 by volume. | Readily soluble. | Particles swollen but mixture not homogeneous. | Insoluble. |
| 1,4-dioxan | Readily soluble. | Particles swollen but mixture not homogeneous. | Insoluble. |

Thus the topochemical treatment in the formal bath, and especially when followed by a heating treatment in a substantially dry state, modified the solubilities markedly.

In the specification and claims of this application I have used the word formal generically to designate condensation products of formaldehyde with alcohol, either monohydric or polyhydric.

Where in the foregoing examples, the catalyst is referred to, for convenience, as ethyl sulfuric acid, I mean, an equi-molecular mixture of sulfuric acid and diethyl sulfate. The mixture was usually prepared and allowed to stand at room temperature for at least 24 hours before use. I have not attempted to ascertain to what extent, if any, ethyl sulfuric acid is actually formed. The mixture is advantageous as a catalyst because it stimulates the reactions which constitute both the first and second steps of the process. I have also used hydrochloric acid in reactions at room temperature but less successfully in reactions at higher temperatures because of the production of unstable by-products. Ammonium chloride has also been used as catalyst as illustrated, for instance, in Example No. 7 above. Ammonium sulfate and sulfuric acid and probably other catalysts may be employed.

The reaction herein described is essentially topochemical since the base material, although it may swell, does not go into solution during the treatment.

When polyvinyl alcohol is employed as a base material, it is dry but not completely anhydrous and we believe that the small amount of moisture which it contains is advantageous. It will also be observed that the water is preferably removed from the zone of the reaction as fast as it is formed. The phrase "essentially anhydrous" appearing in the claims is not intended to exclude moisture or water present under these conditions.

The hereindescribed method is believed to be of great commercial importance because it makes possible the production of water insoluble or difficultly soluble resins directly from cheap base materials which previously have not been thought to be available for this purpose, owing to their ready solubility in water and to the ease with which they are affected by moisture with resultant loss of desirable physical properties. Not only have I made it possible to produce satisfactory resins from these base materials but the process can in many instances be carried out after the base material has been shaped to final form and without putting the base materials into solution, both of which facts have many commercial advantages.

In this application I have claimed the process generically regardless of the specific base material employed and have claimed specifically the products resulting where starch, dextrin and cellulose are used as the base material. The process as applied to polyvinyl alcohol, and the products resulting therefrom are claimed in application filed April 11, 1941, Serial No. 388,144. Other novel products will be claimed in applications to be filed hereafter.

I claim:

1. The process of producing a water insoluble or difficultly soluble substance which comprises reacting a monomeric acetal of a mono-aldehyde with a solid polymeric aliphatic base material containing unreacted hydroxyl groups which can react with the monomeric acetal to form a by-product alcohol, the reaction being conducted under anhydrous conditions in the presence of sulphuric acid and an aldehyde to react with the by-product alcohol to form a monomeric acetal thereby producing a solid product containing acetal groups, the base substance and the acetal resulting from the reaction being in the solid state throughout the process.

2. The process of producing a water resistant material which comprises reacting a monomeric acetal of a mono-aldehyde with a solid polymeric aliphatic base material containing hydroxyl groups, the reaction being conducted under anhydrous conditions in the presence of a catalyst and of an aldehyde and the final product being essentially a polymeric acetal containing unreacted hydroxyl groups of the base material, the base material and the polymeric acetal resulting from the reaction being in the solid state throughout the process.

3. The process which comprises reacting a solid polymeric aliphatic base material containing hydroxyl groups with a monomeric acetal of a mono-aldehyde in the presence of a catalyst to form a solid polymeric acetal and a liquid by-product alcohol, the reaction being conducted under anhydrous conditions in the presence of an aldehyde to react with the by-product alcohol, the base material and the solid polymeric acetal being in the solid state throughout the process.

4. The process which comprises reacting a solid polymeric aliphatic base material containing hydroxyl groups with ethylene glycol formal to form a solid polymeric acetal and a liquid by-product glycol, the reaction being conducted in the presence of paraformaldehyde to react with the by-product alcohol, the base material and the solid polymeric acetal being in the solid state throughout the process.

5. The process of forming a water insoluble or difficultly soluble polymeric acetal which comprises reacting with methyl formal a solid polymeric aliphatic base material containing hydroxyl groups, the reaction being conducted under anhydrous conditions in the presence of paraformaldehyde and a catalyst, the base substance and the polymeric acetal resulting from the reaction being in the solid state throughout the process.

6. The process of stiffening cellulose base articles, such as sheets or filaments, which consists in treating the article with an anhydrous reaction mixture of a monomeric acetal of a mono-aldehyde, a mono-aldehyde and a catalyst, the reaction mixture being a non-solvent for the base material and the stiffened cellulose.

7. The process of forming a water insoluble or difficultly soluble polymeric acetal which comprises reacting with methyl formal a solid water soluble polymeric aliphatic base material containing hydroxyl groups, the reaction being conducted under anhydrous conditions in the presence of paraformaldehyde and a catalyst, the base substance and the polymeric acetal resulting from the reaction being in the solid state throughout the process.

JOSEPH DAHLE.